TELEGRAPHIC SIGNAL DISTORTION MONITOR

Filed July 3, 1962 4 Sheets-Sheet 1

Bernard Leonard Simpson
Anthony Joseph Gibson
Inventors
By Cushman, Darby & Cushman
Attorneys

TELEGRAPHIC SIGNAL DISTORTION MONITOR

Filed July 3, 1962 4 Sheets-Sheet 2

Inventors
Bernard L. Simpson
Anthony J. Wilson
By Cushman, Darby & Cushman
Attorneys Bernard Leonard Simpson
Anthony Joseph Gibson
Inventors
By Cushman, Darby & Cushman
Attorneys

Inventors
Bernard L. Simpson
Anthony J. Gibson
By Cushman, Darby & Cushman
Attorneys United States Patent Office 3,260,799

Patented July 12, 1966

3,260,799

TELEGRAPHIC SIGNAL DISTORTION MONITOR

Bernard Leonard Simpson and Anthony Joseph Gibson, Medmenham, Marlow, England, assignors to Minister of Aviation in Her Majesty's Government of the United Kingdom of Great Britain and Northern Ireland, London, England Filed July 3, 1962, Ser. No. 207,201

Claims priority, application Great Britain, July 5, 1961, 24,247/61

12 Claims. (Cl. 178—69)

The present invention relates to electrical telegraphy.

Electrical telegraph receiving equipments such as teleprinters are capable of tolerating a degree of input distortion. Distortion may arise from the transmission equipment, the transmission path (particularly in wireless telegraphy) or the receiving equipment. When the total distortion exceeds the tolerance of a receiving equipment, the receiving equipment registers an error. If the receiving equipment is a teleprinter printing a message in recognisable words the error can usually be perceived and corrected but if the receiving equipment is not a teleprinter or if a received message is in figures or code then errors may be impossible to detect. Normally a printing standard, expressed as a character error rate (for example, six errors per thousand), is laid down and the telegraph circuit made to conform to the printing standard wherever possible.

It is an object of the present invention to provide a device whereby a continuous watch may be made on the incoming signal quality to ascertain whether a signal is to the required printing standard, and if not, whether it may usefully be regenerated to attain the required printing standard or not. It is a further object of the invention to provide a continuous record of signal quality showing signal quality trends and a permanent record of circuit performance if this is required for analysis and comparison purposes.

An embodiment of the invention will now be described by way of example and with reference to the accompanying drawings, in which.

In the graphical representations of waveforms, a MARK is represented negatively and a SPACE positively.

Figure 1:
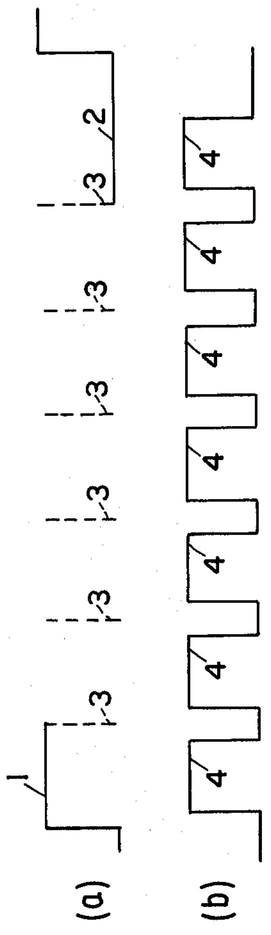
FIGURE 1 is a graphical representation of certain waveforms, plotted against time, occurring in the operation of the embodiment.

FIGURE 1 is a graphical representation of certain waveforms, plotted against time, occurring in the operation of the embodiment. A waveform (*a*) is an idealised representation of a character in a typical 7½ element start/stop telegraphy signal. Each character has a positive start element 1 of unit length and a negative stop element 2, 1½ units long. The remaining five elements are one unit long and may be positive or negative (i.e. SPACES or MARKS respectively) according to the character. Broken lines 3 denote times at which any changeover occurring between these elements will occur. These times will hereinafter be referred to as "proper positions." Distortion, when it occurs, has the effect of displacing a changeover away from the relevant proper position.

A reference pulse waveform (*b*) is generated in the embodiment to gauge the position of such changeovers. Each pulse 4, which is positive, begins shortly after the proper position and ends shortly before the next proper position in such a way that the proper position is exactly half-way between pulses. The pulse width is set in accordance with an acceptance limit, which is defined as the maximum amount (expressed as a percentage of one unit basic element length) by which a signal element changeover may deviate from its proper position without being considered unacceptably distorted. The pulses are arranged to begin and end at a position removed from each proper position by the unit basic element length multiplied by the acceptance limit. In other words, the pulse length, expressed as a percentage of the basic element length, is 100—2*L*, where *L* is the acceptance limit. Thus a changeover will be considered to be unacceptable if and only if it coincides with a reference pulse. The method of generating the gate pulse waveform (*b*) is described below with reference to FIGURE 2. The acceptance limit is set by an acceptance limit switch which has several discrete positions, for example, the nine positions from 5% to 45% by 5% intervals.

If any character contains an unacceptable changeover it is called a reject character. When the acceptance limit is high a reject character may cause a misprint in receiving equipment that may be in use, for example, a teleprinter. A maximum error rate for the telegraph channel is decided, for example, a rate of six errors per thousand. The rate of reject characters in the incoming signal is tested and if it exceeds the maximum error rate the acceptance limit is automatically raised by a method shown below and vice versa. The testing is done by two counters to count the reject characters and the total characters respectively and which are set up in accordance with one over the error rate. For example, if the error rate is six errors per thousand the reject counter is set to emit a pulse when it registers seven counts and the total counter is set to emit a pulse when it registers 1,000 counts. Thus if the error rate is exceeded, seven errors will occur before 1,000 total characters, but if it is not exceeded, 1,000 characters will occur before seven errors, so that the first counter to be filled determines whether the acceptance limit is raised or lowered. The method of carrying this out is described below with reference to FIGURE 6.

In the case of a signal which does not consist of characters in a telegraph code, for example, a signal in pure binary code, the word "character" may have no significance and so batches of digits are taken at a time in the place of characters. The taking of batches of digits thus may be found useful in a statistical analysis to be undertaken.

Figure 2:
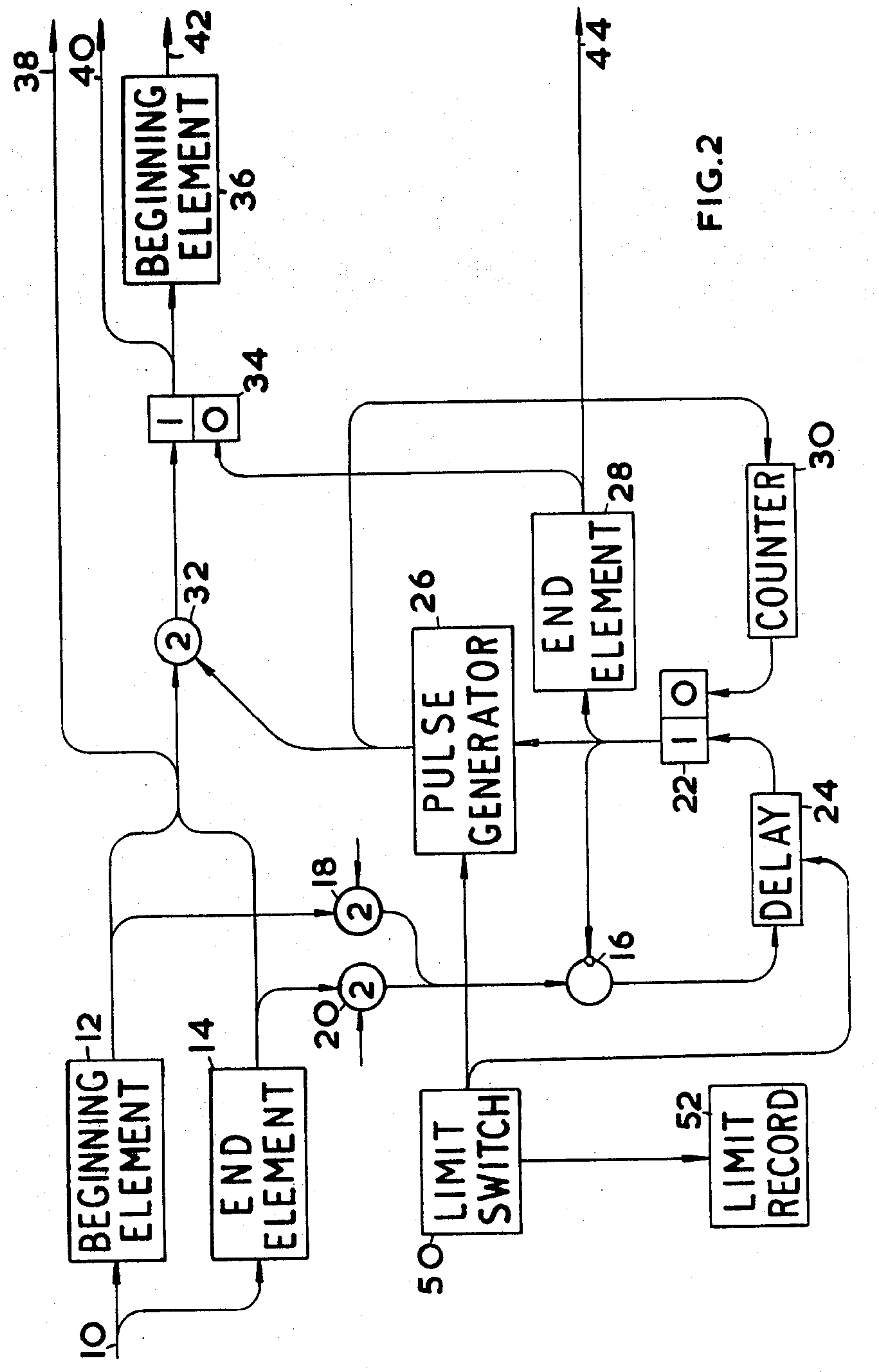
FIGURE 2 is a circuit diagram of part of the embodiment.

FIGURE 2 is a circuit diagram of a part of the embodiment. In FIGURE 2, the units 18, 20 and 32 are *and* gates of threshold 2, the unit 16 is a gate with an inhibitory input, and the units 22 and 34 are bistable trigger circuits. Examples of such circuits are described in U.S. patent specification No. 2,686,632. The units 12 and 36 are beginning elements and the units 14 and 28 are end elements in accordance with the British Standard 530: 1948, supplement 5 (1957). A beginning element is a pulse forming network which may be triggered by the leading edge of an input pulse. A beginning element may be realized in practice as a circuit such as that described in U.S. Patent No. 2,686,632 with reference to FIGURES 8 and 9 thereof, or as a one-shot multivibrator driven by such a circuit. An end element is a pulse forming network which may be triggered by the trailing edge of an input pulse. An end element may be realized in practice as a beginning element of the type described in U.S. Patent No. 2,686,632 preceded by an inverting stage. An input channel 10 is applied to a beginning element 12 and to an end element 14. The beginning element 12 is connected to an inhibiting gate 16 via an *and*-gate 18 and the end element 14 is connected to the inhibiting gate 16 via an *and*-gate 20. The output of the inhibiting gate 16 is connected to a trigger 22, in a sense such as to put it into a 1-state, via a delay 24. The output of the trigger, when it is in the 1-state, is applied to the inhibiting input of the inhibiting gate 16 to shut that gate, to a pulse generator 26 and to an end element 28. The output of the pulse generator 26 is applied to the trigger 22 to put it into the 0-state via a counter 30. An *and*-gate 32 having two inputs is fed from the beginning element 12 and the end element 14 into one input and from the pulse generator 26 into the other input. A trigger 34 is connected to be put into the 1-state by the output of the gate 32 and into the 0-state by the output of the end element 28. When it is in the 1-state it applies an output to a beginning element 36. Two output channels 42 and 44 are taken respectively from the beginning element 36 and the end element 28. Two further output channels 38 and 40 may be taken, if desired, respectively from the beginning element 12 taken together with the element 14 and from the gate 32. The acceptance limit switch 50 is connected to control the pulse generator 26 and the delay 24. The acceptance limit switch is connected to control also a pen recorder 52.

The action of the circuit will be explained with reference to FIGURE 3, FIGURE 4 and FIGURE 5, which are graphical representations of certain waveforms, plotted against time, which may occur in the operation of the embodiment.

The circuit operates cyclically, each cycle corresponding to each full count of the counter 30. The incoming signal is applied, via the channel 10, to the beginning element 12 and the end element 14. In FIGURE 3 a waveform (*a*) represents a possible incoming signal consisting of the four characters SDWS expressed in a 7½ element start/stop telegraphy signal having a MARK stop and a SPACE start. The end element 14 produces a pulse at every MARK to SPACE changeover, and the beginning element 12 produces a pulse at every SPACE to MARK changeover. A waveform (*b*) represents the output of the end element 14. A similar waveform (not shown), but with pulses at every MARK to SPACE changeover of the waveform (*a*) instead of every SPACE to MARK changeover would represent the output of the beginning element 12. If the gate 18 is held open the output of the beginning element 12 is presented to the inhibiting gate 16; if the gate 20 is held open the output of the end element 14 is presented to the inhibiting gate 16; and if both gates 18 and 20 are held open the outputs of both the beginning element 12 and the end element 14 are presented to the inhibiting gate 16. The ultimate function of these gates is explained below; in this application it is assumed that the gate 18 is closed and that the gate 20 is open, which is normal for start/stop telegraphy having a MARK stop and a SPACE start. Thus the signal represented by the waveform (*b*) is presented to the inhibiting gate 16. The trigger 22 is put into the 0-state at the end of each cycle, as is described below, and so the first pulse of the waveform (*b*) is allowed through the gate 16 to be delayed in the delay 24 and applied to the trigger 22 to put it into the 1-state, causing the inhibiting gate 16 to be closed and preventing any further pulses of the waveform (*b*) from being applied to the delay 24. Two waveforms (*c*) and (*d*) represent the outputs of the delay 24 and the trigger 22 respectively. The output of the trigger 22 is also applied to the pulse generator 26 which emits square pulses for the duration of the applied signal. A waveform (*e*) represents the output of the pulse generator 26. Part of this pulse waveform is the waveform labelled (*b*) in FIGURE 1. The square pulses are applied to the counter 30, which restores the trigger 22 to the 0-state after a predetermined number of pulses have been applied to it. In this case the predetermined number is 7 because 7½ element start/stop telegraphy is being used. With the trigger 22 in the 0-state the circuit is prepared to accept the next character.

The output of the acceptance limit switch 50 controls the delay produced by the delay unit 24 and the pulse length of the pulses produced by the pulse generator 26, so that the amount of the delay in the delay unit 24, expressed as a percentage of the unit basic element length, is exactly equal to the acceptance limit defined above, and the pulse length is that prescribed for the pulses with reference to the waveform (*b*) of FIGURE 1, namely, expressed as a percentage of the basic element length, $100-2L$ where L is the acceptance limit. Thus when the acceptance limit is altered, the acceptance limit switch is altered to control the delay in the delay unit 24 and the pulse length of the pulses emitted by the pulse generator 26 in any known manner to conform to the new acceptance limit.

Figure 3:
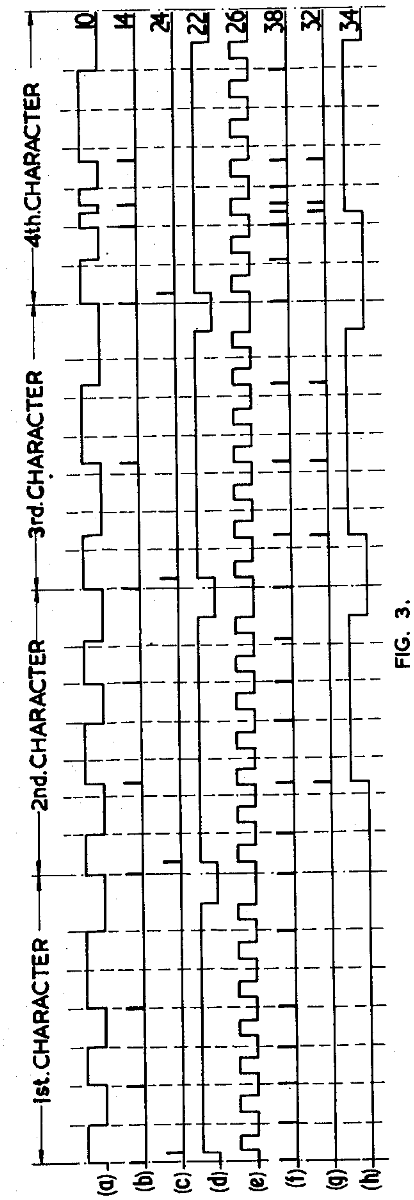
FIGURE 3, FIGURE 4 and FIGURE 5 are graphical representations of certain waveforms, plotted against time, which may occur in the operation of the embodiment.

The combined outputs of the beginning element 12 and the end element 14, represented by a waveform (*f*) of FIGURE 3, are applied to the gate 32 together with the output of the pulse generator 26; thus if a changeover occurs outside the acceptance limit, the gate 32 will emit a pulse, as the changeover pulse will coincide with a pulse from the pulse generator 26. The output of the gate 32 is represented by a waveform (*g*). The first unacceptable changeover in each character causes the trigger 34 to be put into the 1-state. The trigger 34 remains in the 1-state until the end element 28 emits a pulse to put it back into the 0-state which happens when the trigger 22 is put into the 0-state. The state of the trigger 34 is represented by a waveform (*h*).

The output channels 38 and 40 may be applied to counters (not shown) which count respectively the total changeovers in the applied signal and the unacceptable changeovers. The output channels 42 and 44 are applied to counters which count respectively the reject batches or characters and the total batches or characters, the beginning element 36 serving to emit one pulse every time a batch is rejected. These counters are more particularly described below with reference to FIGURE 6.

In FIGURE 3 an input signal consists of four characters of 7½ element start/stop telegraphy signal, the first character of which is perfect. All the changeovers in this character (shown by the waveform (*f*)) occur between the pulses emitted by the pulse generator 26 which are shown in the waveform (*e*). Therefore no unacceptable changeovers occur and the gate 32 does not emit a pulse. The second character contains two changeovers which are not at the proper position. Only one of these is serious enough to coincide with a pulse from the pulse generator 26. This puts the trigger 34 into the 1-state until it is put into the 0-state by the trigger 22 being put into the 0-state. The third character contains three unacceptable changeovers, but naturally the trigger 34 only goes into the 1-state once. This is true of the fourth character which contains three unacceptable changeovers, two of which have been occasioned by a split element (the third element of the character). Thus in this example, out of 24 changeovers, seven are unacceptable, whereas out of four characters, three are reject characters.

Figure 4:
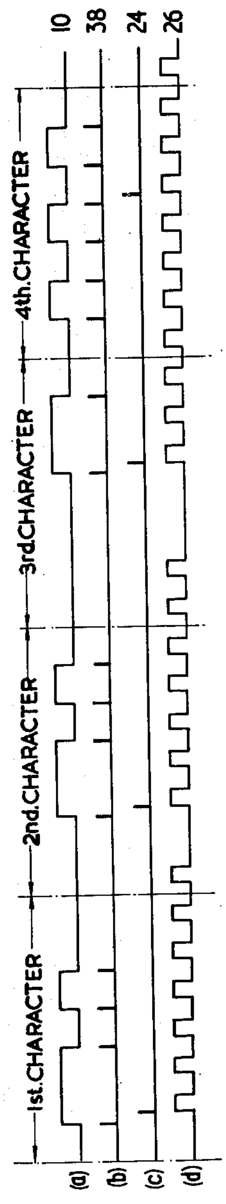
Figure 5:
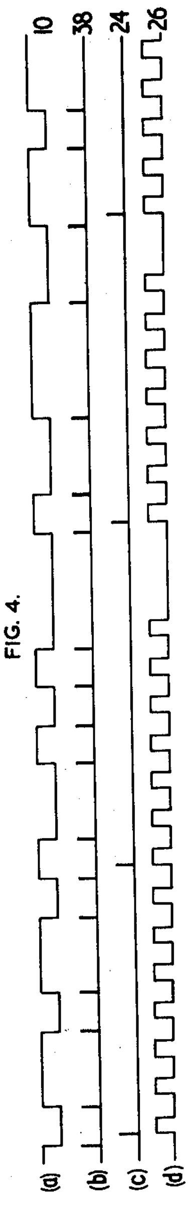

The sampling procedure in respect of forms of binary element signalling other than the start/stop kind is illustrated in FIGURE 4, which illustrates the procedure for a telegraphy signal using a five element code having no stop/start changeover, and FIGURE 5, which illustrates the procedure for a pure binary signal.

In the telegraphy signal illustrated in FIGURE 4 (*a*) there is, of course, no specific changeover, similar to the stop/start changeover, which recurs at a set time in each character. Thus at the conclusion of each test cycle (marked by each sequence of seven pulses in the waveform (*d*)) the circuit waits for the next changeover operating on the gate 16 and starts another test cycle. In this manner, the test cycles fall behind the signal characters, as shown. In order to reduce the amount by which they fall behind, the gate 18 is open as well as the gate 20 so that a test cycle may be initiated by either a SPACE to MARK changeover or a MARK to SPACE changeover. By this method all the changeovers in the signal are in effect subjected to analysis and the apparent dropping of elements between cycles is unimportant since the elements dropped contain no changeovers and therefore cannot be distorted. In this case the test cycles have the same length as the characters but are not necessarily coincident with them in time. Nevertheless, the number of rejection batches is a close approximation to the number of reject characters. A waveform (*b*) and a waveform (*c*) in FIGURE 4 illustrate respectively the output of the beginning element 12 taken together with the end element 14 and the output of the delay 24.

In the binary signal illustrated in FIGURE 5(*a*) there is no reason for the number of pulses in each test cycle to be seven although that is the number illustrated. Any convenient number greater than or equal to 2 may be chosen; in particular, any number suitable for a batch size in a statistical analysis may be chosen. Three waveforms (*b*), (*c*) and (*d*) represent respectively the output of the beginning element 12 taken together with the end element 14, the output of the delay 24 and the output of the pulse generator 26.

As stated above, it is normal in start/stop telegraphy for the gate 18 to be closed and the gate 20 to be open so that the test cycle may begin on a MARK to SPACE changeover, and preferably on the stop/start changeover. In other systems, as stated above, it is convenient for both the gates 18 and 20 to be open so that all the changeovers in the signal are analysed. Alternatively the gate 18 may be open and the gate 20 may be shut so that the test cycle may only be initiated by a SPACE to MARK changeover. This facility may be used when the incoming telegraph signal is a signal of reversed polarity, i.e., positive mark and negative space. The pen recorder 52 provides a continuous record of the acceptance limit and thus of the incoming signal quality. Hence it may be readily ascertained whether a signal is to the required printing standard, and if not whether it may usefully be regenerated in a conventional regenerator or not.

The synchronisation of the test cycles with the incoming telegraph signal characters is readily carried out automatically in the embodiment described in the following manner. In the absence of synchronisation the test cycles fall behind the signal characters as in the case of a telegraphy signal having no stop/start changeover (for example, the signal illustrated in FIGURE 4(*a*)). This continues until a changeover which recurs at a set time in each character initiates a test cycle, when the system becomes synchronised, since the only such changeover is of course, the stop/start changeover.

Figure 6:
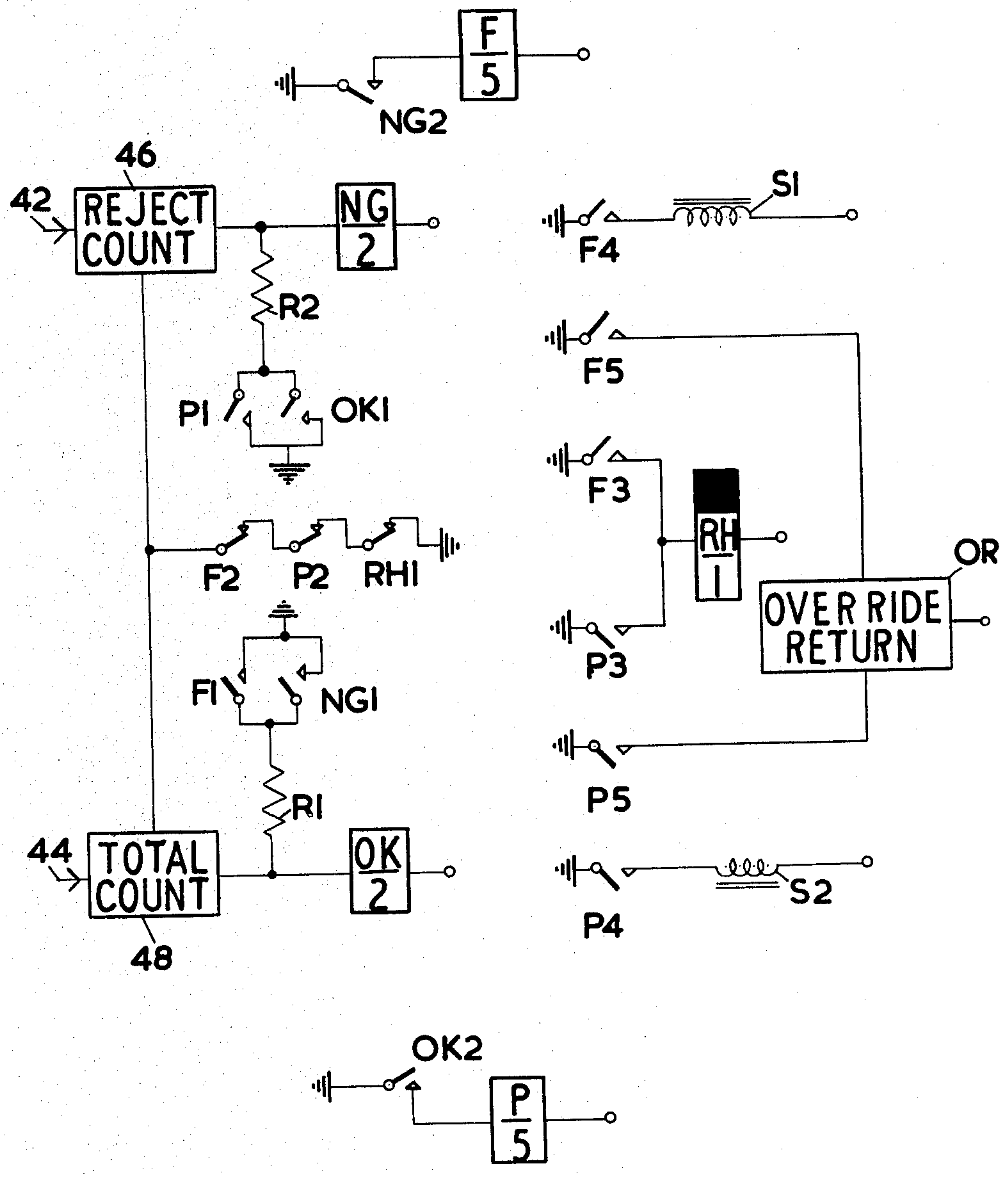
FIGURE 6 is a circuit diagram of another part of the embodiment.

FIGURE 6 is a circuit diagram of another part of the embodiment. The channel 42 from the beginning element 36 (FIGURE 2) is fed to a reject counter 46 which counts the number of reject characters. The channel 44 from the end element 28 (FIGURE 2) is fed to a total counter 48 which counts the total number of characters. As explained above, if the character error rate is $n$ errors per $m$ characters then the reject counter 46 is set so as to have a capacity of $n+1$ and the total counter 48 is set so as to have a total capacity of $m$. While the counters are counting a relay NG/2 connected to the reject counter 46 is energised, holding open two pairs of contacts NG1 and NG2, and a relay OK/2 connected to the total counter 48 is energised, holding open two pairs of contacts OK1 and OK2. When both of the relays NG/2 and OK/2 are energised, three further relays F/5, P/5 and RH/1 are in the released condition as will be apparent from the drawing.

When it is filled, the reject counter 46 will emit a pulse some 50 milliseconds in length and this pulse will release the relay NG/2 if the total counter 48 is not yet filled. This has the effect of closing the contacts NG1 to hold the relay OK/2 on by earthing its connection from the total counter 48 via a resistor R1. Thus the relay OK/2 is prevented from being released. Also, in this instance, the contacts NG2 close to energise the relay F/5. This has the effect of closing a pair of contacts F1 in parallel with the contacts NG1, ensuring that the relay OK/2 is energised at least until the relay F/5 is released. A pair of contacts F2 is opened by the energisation of the relay F/5, thus breaking a common reset line consisting of the contacts F2 and two further pairs of contacts P2 and RH1. By this means the counters 46 and 48 are reset. At this stage a spurious output pulse from the total counter 48 caused by the resetting of the total counter 48 may be produced. This spurious output pulse will also be 50 milliseconds long, and is prevented from releasing the relay OK/2 at its leading edge by the closed contacts NG1. Since the contacts NG1 are to open at the conclusion of the 50 millisecond pulse emitted by the reject counter 46, the relay OK/2 must be prevented from being released for the duration of the time that the relay F/5 is energised. This is performed by the closed contacts F1. A pair of contacts F3, which have been closed by the energisation of the relay F/5, cause the relay RH/1, which is a slow-releasing relay, to be operated. A solenoid S1 is energised by a similar closure of a further pair of contacts F4. This solenoid causes the acceptance limit switch 50 (shown in FIGURE 2) to be moved to an adjacent position in such a way that the acceptance limit is widened unless it is at its maximum limit already. A similar closure of a pair of contacts F5 causes an override return circuit OR to be prepared so that if the acceptance limit switch 50 of FIGURE 2 is being urged to step beyond its maximum limit it will return to the same position. Such override return circuits are well-known to those skilled in the art. The contacts RH1, which have been opened by the energisation of the relay RH/1 hold the counters 46 and 48 reset for some 300 milliseconds, preventing them from counting until the circuit described with reference to FIGURE 2 has had time to resynchronise (if necessary) after the change of acceptance limit. Meanwhile the pulse emitted by the reject counter 46, which is, as stated above, some 50 milliseconds long, will have ended, allowing the relay NG/2 to become energised and consequently restoring the circuit to its initial condition.

A similar but opposite sequence is followed when the total counter 48 is filled before the reject counter 46. The total counter 48 emits a pulse (some 50 milliseconds long) which releases the relay OK/2, causing the relay NG/2 to be held on via a pair of contacts OK1 and a resistor R2 and causing thte relay P/5 to be energised via a pair of contacts OK2. The consequent closure of a pair of contacts P1 causes the relay NG/2 to be held on at least until the relay P/5 is released, and the contacts P2 are opened, resetting the counters. Any spurious output pulse from the reject counter 46 is prevented from releasing the relay NG/2 by the action of the contacts P1 and OK1. Three pairs of contacts P3, P4, and P5 cause the relay RH/1, a solenoid S2 and the override circuit OR to be operated respectively. The solenoid S2 causes the acceptance limit switch 50 of FIGURE 2 to be moved to an adjacent position in such a way that the acceptance limit is narrowed unless it is at its minimum limit already. If the acceptance limit switch 50 is urged to step beyond its minimum limit, the override return circuit OR will return it to the same position. The contacts RH1 act as before, and the circuit is restored to its initial condition as before.

Instead of the pen recorder 52 of FIGURE 2 the acceptance limit switch may be connected to any other indicating or controlling means; for example, the acceptance limit may be indicated by a meter or an indicating lamp, or the acceptance limit switch 50 of FIGURE 2 may be used to switch a regenerator into a telegraph circuit or to disconnect receiving equipment when the signal quality received falls below the minimum tolerated by the receiving equipment.

As an alternative to counting reject characters and total characters the circuit illustrated in FIGURE 6 may be used to count unacceptable changeovers and the total changeovers. There are disadvantages in this method, however; circuit requirements are conventionally stated in terms of character errors, which have no fixed relationship to changeover errors; and the seriousness of a changeover error varies according to its place in a character, the displacement of a stop/start changeover appearing to throw all the other changeovers in the character away from their proper positions.

We claim:

1. A telegraphic signal monitoring system including a first counter for counting the number of elements of a received telegraph signal; electrically-controllable reference pulse generating means for generating rectangular reference pulses whose edges correspond to selected acceptance limits for the timing of changeovers occurring in the received signal; changeover pulse generating means for generating a changeover pulse at each changeover in the received signal; comparison means, connected to the reference pulse generating means and to the changeover pulse generating means, for providing an output signal whenever at least one of the changeovers in a character of the received signal is displaced in time beyond one of the selected acceptance limits, and for providing an output signal whenever at least one of the changeovers in a character of the received signal is displaced in time beyond the other of the selected acceptance limits; a second counter, connected to the output of the comparison means, for counting the output signals from the comparison means; and selection means, connected to the said first and second counters and to the said reference pulse generating means for controlling the pulse generating means so that the timing of the edges of the reference pulses will be altered to correspond to broader acceptance limits whenever the proportion of distorted characters counted by the second counter to the total number of elements coupled by the first counter becomes greater than a predetermined ratio and will be altered to correspond to narrower acceptance limits whenever the proportion of distorted characters counted by the second counter to the total number of elements counted by the first counter becomes less than a predetermined ratio.

2. A telegraph signal monitoring system according to claim 1 and wherein the said selection means includes an acceptance limit switch connected to be operable by outputs of the said counters and connected to control the reference pulse generating means so that it generates reference pulses of longer pulse length if the said first counter reaches a set capacity before the said second counter reaches another set capacity, and so that it generates reference pulses of shorter pulse length if the said second counter reaches its set capacity before the said first counter reaches its set capacity, and wherein both counters are reset to zero when either counter reaches its set capacity.

3. A telegraph signal monitoring system according to claim 2 and wherein the said selection means includes first and second gates respectively connected to outputs of the said first and second counters and wherein the output of each gate is connected to an inhibiting input of the other gate and to a controlling input of the said acceptance limit switch so that a signal from the said first gate will result in the generation of reference pulses of longer pulse length, whereas a signal from the said second gate will result in the generation of reference pulses of shorter pulse length, and wherein the combined output of both gates is connected to resetting connections of both of the said counters.

4. A telegraph signal monitoring system according to claim 2 and wherein the acceptance limit switch renders correcting equipment active when the acceptance limit switch is in one of its states and renders the correcting equipment inactive when the acceptance limit switch is in another of its states.

5. A telegraphic signal monitoring system including a first counter for counting the number of elements of a received telegraph signal; electrically-controllable reference pulse generating means for generating rectangular reference pulses whose edges correspond to selected acceptance limits for the timing of changeovers occurring in the received signal; changeover pulse generating means for generating a changeover pulse at each changeover in the received signal; comparison means, connected to the reference pulse generating means and to the changeover pulse generating means, for providing an output signal wherever at least one of the changeovers in a batch of elements of the received signal is displaced in time beyond one of the selected acceptance limits, and for providing an output signal wherever at least one of the changeovers in a batch of elements of the received signal is displaced in time beyond the other of the selected acceptance limits; a second counter, connected to the output of the comparison means, for counting the output signals from the comparison means; and selection means, connected to the said first and second counters and to the said reference pulse generating means for controlling the pulse generating means so that the timing of the edges of the reference pulses will be altered to correspond to broader acceptance limits whenever the proportion of distorted batches of elements counted by the second counter to the total number of elements counted by the first counter becomes greater than a predetermined ratio and will be altered to correspond to narrower acceptance limits whenever the proportion of distorted batches of elements counted by the second counter to the total number of elements counted by the first counter becomes less than a predetermined ratio.

6. A telegraph signal monitoring system according to claim 5 and wherein the said selection means includes an acceptance limit switch connected to be operable by outputs of the said counters and connected to control the reference pulse generating means so that it generates reference pulses of longer pulse length if the said first counter reaches a set capacity before the said second counter reaches another set capacity, and so that it generates reference pulses of shorter pulse length if the said second counter reaches its set capacity before the said first counter reaches its set capacity, and wherein both counters are reset to zero when either counter reaches its set capacity.

7. A telegraph signal monitoring system according to claim 5 and wherein the said selection means includes first and second gates respectively connected to outputs of the said first and second counters and wherein the output of each gate is connected to an inhibiting input of the other gate and to a controlling input of the said acceptance limit switch so that a signal from the said first gate will result in the generation of reference pulses of longer pulse length, whereas a signal from the said second gate will result in the generation of reference pulses of shorter pulse length, and wherein the combined output of both gates is connected to resetting connections of both of the said counters.

8. A telegraph signal monitoring system according to claim 5 and wherein the acceptance limit switch renders correcting equipment active when the acceptance limit switch is in one of its states and renders the correcting equipment inactive when the acceptance limit switch is in another of its states.

9. A telegraphic signal monitoring system including a first counter for counting the number of characters of a received telegraph signal; electrically-controllable reference pulse generating means for generating rectangular reference pulses whose edges correspond to selected acceptance limits for the timing changeover occurring in the received signal; changeover pulse generating means for generating a changeover pulse at each changeover in the received signal; comparison means, connected to the reference pulse generating means and to the changeover pulse generating means, for providing an output signal whenever at least one of the changeovers in a character of the received signal is displaced in time beyond one of the selected acceptance limits, and for providing an output signal whenever at least one of the changeovers in a character of the received signal is displaced in time beyond the other of the selected acceptance limits; a second counter, connected to the output of the comparison means, for counting the output signals from the comparison means; and selection means, connected to the said first and second counters and to the said reference pulse generating means for controlling the pulse generating means so that the timing of the edges of the reference pulses will be altered to correspond to broader acceptance limits whenever the proportion of distorted characters counted by the second counter to the total number of elements counted by the first counter becomes greater than a predetermined ratio and will be altered to correspond to narrower acceptance limits whenever the proportion of distorted characters counted by the second counter to the total number of characters counted by the first counter becomes less than a predetermined ratio.

10. A telegraph signal monitoring system according to claim 9 and wherein the said selection means includes an acceptance limit switch connected to be operable by outputs of the said counters and connected to control the reference pulse generating means so that it generates reference pulses of longer pulse length if the said first counter reaches a set capacity before the said second counter reaches another set capacity, and so that it generates reference pulses of shorter pulse length if the said second counter reaches its set capacity before the said first counter reaches its set capacity, and wherein both counters are reset to zero when either counter reaches its set capacity.

11. A telegraph signal monitoring system according to claim 9 and wherein the said selection means includes first and second gates respectively connected to outputs of the said first and second counters and wherein the output of each gate is connected to an inhibiting input of the other gate and to a controlling input of the said acceptance limit switch so that a signal from the said first gate will result in the generation of reference pulses of longer pulse length, whereas a signal from the said second gate will result in the generation of reference pulses of shorter pulse length, and wherein the combined output of both gates is connected to resetting connections of both of the said counters.

12. A telegraph signal monitoring system according to claim 9 and wherein the acceptance limit switch renders correcting equipment active when the acceptance limit switch is in one of its states and renders the correcting equipment inactive when the acceptance limit switch is in another of its states.

References Cited by the Examiner

UNITED STATES PATENTS

| | | | |
|---|---|---|---|
| 2,482,932 | 9/1949 | Pyatt et al. | 178—69 |
| 2,597,071 | 5/1952 | Cory | 178—69 |
| 2,856,457 | 10/1958 | Prior et al. | 178—69 |
| 2,868,875 | 1/1959 | Di Santi et al. | 340—146 |
| 2,985,716 | 5/1961 | Day | 178—69 |
| 2,996,248 | 8/1961 | Abbott | 340—146 |
| 3,036,290 | 5/1962 | Zarouni | 178—69 |
| 3,045,061 | 7/1962 | Slayton | 178—69 |
| 3,130,268 | 4/1964 | Peterson et al. | 178—69 |

NEIL C. READ, *Primary Examiner.*

ROBERT H. ROSE, *Examiner.*

A. J. DUNN, T. A. ROBINSON, *Assistant Examiners.*